(12) United States Patent
Hinski

(10) Patent No.: US 10,803,431 B2
(45) Date of Patent: Oct. 13, 2020

(54) PORTABLE DEVICE FOR FINANCIAL DOCUMENT TRANSACTIONS

(71) Applicant: Top Image Systems Ltd., Ramat-Gan (IL)

(72) Inventor: Yuval Hinski, Ramat-Gan (IL)

(73) Assignee: TOP IMAGE SYSTEMS LTD., Ramat-Gan (IL)

( * ) Notice: Subject to any disclaimer, the term of this patent is extended or adjusted under 35 U.S.C. 154(b) by 419 days.

(21) Appl. No.: 14/372,491

(22) PCT Filed: Mar. 12, 2013

(86) PCT No.: PCT/IL2013/050225
§ 371 (c)(1),
(2) Date: Jul. 16, 2014

(87) PCT Pub. No.: WO2013/136328
PCT Pub. Date: Sep. 19, 2013

(65) Prior Publication Data
US 2015/0032631 A1 Jan. 29, 2015

Related U.S. Application Data

(60) Provisional application No. 61/609,379, filed on Mar. 12, 2012.

(51) Int. Cl.
*G06Q 20/10* (2012.01)
*G06Q 20/04* (2012.01)
(Continued)

(52) U.S. Cl.
CPC ....... *G06Q 20/108* (2013.01); *G06K 9/00442* (2013.01); *G06K 9/186* (2013.01); *G06Q 20/042* (2013.01); *G06Q 20/3223* (2013.01)

(58) Field of Classification Search
CPC .................................................. G06Q 20/108
(Continued)

(56) References Cited

U.S. PATENT DOCUMENTS 5,308,959 A * 5/1994 Cherry .................. G06K 7/084
235/379
6,671,395 B1 * 12/2003 Ott .......................... G06K 9/44
358/465
(Continued)

FOREIGN PATENT DOCUMENTS

EP 1700249 9/2006
JP 2003-216893 7/2003
(Continued)

OTHER PUBLICATIONS

International Preliminary Report on Patentability dated Sep. 25, 2014 From the International Bureau of WIPO Re. Application No. PCT/IL2013/050225.
(Continued)

*Primary Examiner* — Alexander G Kalinowski
*Assistant Examiner* — Paul R Kloberg
(74) *Attorney, Agent, or Firm* — Zilka-Kotab, P.C.

(57) ABSTRACT

A system which comprises a server which processes a plurality of financial document transaction requests each having a magnetic ink character recognition (MICR) code and an image of a financial document and a module installed in a portable device having an image sensor, a processor and a transmitter, the module uses the processor to extract a MICR code from a financial document imaged in an image captured using the image sensor and uses the transmitter to forward the MICR code and the image to the server via a network as a financial document transaction request.

15 Claims, 4 Drawing Sheets

(51) Int. Cl.
*G06K 9/18* (2006.01)
*G06K 9/00* (2006.01)
*G06Q 20/32* (2012.01)

(58) Field of Classification Search
USPC .......................................................... 705/45
See application file for complete search history.

(56) References Cited

U.S. PATENT DOCUMENTS

| | | | | |
|---|---|---|---|---|
| 7,203,663 | B1* | 4/2007 | Buisman | G06K 9/2054 |
| | | | | 705/38 |
| 7,949,177 | B2* | 5/2011 | Gudenburr | G06K 9/186 |
| | | | | 382/137 |
| 8,538,124 | B1* | 9/2013 | Harpel | G06K 9/03 |
| | | | | 382/131 |
| 9,779,392 | B1* | 10/2017 | Prasad | G06Q 20/0425 |
| 2005/0244035 | A1* | 11/2005 | Klein | H04N 1/0009 |
| | | | | 382/112 |
| 2006/0182331 | A1* | 8/2006 | Gilson | G06Q 20/04 |
| | | | | 382/137 |
| 2008/0180750 | A1* | 7/2008 | Feldman | G06Q 20/042 |
| | | | | 358/3.28 |
| 2009/0141962 | A1 | 6/2009 | Borgia et al. | |
| 2009/0147988 | A1* | 6/2009 | Jones | H04N 1/00034 |
| | | | | 382/100 |
| 2009/0313167 | A1* | 12/2009 | Dujari | G06Q 20/108 |
| | | | | 705/43 |
| 2009/0313245 | A1* | 12/2009 | Weyl | G06F 16/5846 |
| 2011/0091092 | A1* | 4/2011 | Nepomniachtchi | |
| | | | | G06K 9/00463 |
| | | | | 382/139 |
| 2011/0134248 | A1* | 6/2011 | Heit | G06O 20/40 |
| | | | | 348/161 |
| 2011/0194750 | A1 | 8/2011 | Nepomniachtchi | |
| 2011/0211746 | A1* | 9/2011 | Tran | G06K 9/00 |
| | | | | 382/137 |
| 2012/0030117 | A1* | 2/2012 | Huff | G06Q 20/10 |
| | | | | 705/45 |
| 2012/0170073 | A1* | 7/2012 | Rumford | H04N 1/0044 |
| | | | | 358/1.15 |
| 2013/0120595 | A1* | 5/2013 | Roach | G06K 9/38 |
| | | | | 348/207.1 |
| 2013/0155474 | A1* | 6/2013 | Roach | G06K 9/42 |
| | | | | 358/505 |
| 2013/0223721 | A1* | 8/2013 | Nepomniachtchi | G06K 9/036 |
| | | | | 382/138 |
| 2015/0032631 | A1* | 1/2015 | Hinski | G06K 9/00442 |
| | | | | 705/45 |

FOREIGN PATENT DOCUMENTS

| | | |
|---|---|---|
| JP | 2005-006255 | 1/2005 |
| JP | 2012-504273 | 2/2012 |
| WO | WO 2010/039337 | 4/2010 |
| WO | WO 2013/136328 | 9/2013 |

OTHER PUBLICATIONS

International Search Report and the Written Opinion dated Aug. 16, 2013 From the International Searching Authority Re. Application No. PCML2013/050225.

Decision to Grant A European Patent Pursuant to Article 97(1) EPC dated Sep. 1, 2016 From the European Patent Office Re. Application No. 13760670.3.

Supplementary European Search Report and the European Search Opinion dated Aug. 24, 2016 From the European Patent Office Re. Application No. 13760670.3.

Notice of Reasons for Rejection dated Feb. 7, 2017 From the Japan Patent Office Re. Application No. 2014-561584 and Its Translation Into English. (8 Pages).

Office Action dated Apr. 3, 2017 From the Israel Patent Office Re. Application No. 234482. (2 Pages).

Fujiyoshi "Practical Use of Smart Devices in U.S. Financial Institutions", Financial Information Technology Focus, 2012(2/Chap.4): Feb. 12-15, 2012.

Decision to Grant A Patent dated Jul. 18, 2017 From the Japan Patent Office Re. Application No. 2014-561584 and Its Translation Into English. (6 Pages).

European Office Communication and Exam Report from European Application No. 13760670.3, dated Mar. 18, 2020.

* cited by examiner

PORTABLE DEVICE FOR FINANCIAL DOCUMENT TRANSACTIONS

FIELD AND BACKGROUND OF THE INVENTION

The present invention, in some embodiments thereof, relates to financial document transactions, and, more particularly, but not exclusively, to methods and systems of using a portable device for financial document transactions.

Financial documents, such as checks, deposit, slips, payment slips and/or the like are processed by banks and other financial institutions in large numbers. The financial documents that may be processed might include checks, During the last year, financial institutions, such as banks, have automated financial documents processing systems by printing computer readable indications of financial information on financial documents, for example account numbers and bank routing numbers. During the processing of a financial document, the computer readable indications are identified and financial data, such as a deposited amount, an account number, bank identification, and/or a branch of bank identification are automatically extracted. For example, when the financial document is a check a check processing control system that captures information from the Magnetic Ink Character Recognition (MICR) line is used. The MICR line consists of machine and human readable characters which are printed on a check using magnetic ink. The MICR data fields include the bank routing number (RIN), bank transit number, account number, check serial number, check amount, process code and extended process code.

SUMMARY OF THE INVENTION

According to some embodiments of the present invention there is provided a method of performing a transaction of a financial document using a portable image sensor enabled device. The method comprises capturing, using an image sensor of a portable device, a plurality of images depicting a financial document performing the following during the capturing, processing at least one of the plurality of images to derive at least one image quality parameter indicative of a visibility level of the financial document in at least one of the plurality of images, calculating instructions indicative of at least one user operation required to change the at least one image quality parameter to increase the visibility level, when the at least one image having the visibility level above a visibility threshold is captured, analyzing the at least one image to extract a magnetic ink character recognition (MICR) code, and transmitting the MICR code and the at least one image to a server for performing a financial transaction based on the financial document.

Optionally, the transmitting comprises transmitting the at least one image in association with the MICR code to the server.

Optionally, the method further comprises presenting a user interface (UI) on a display of the portable device and receiving from a user financial data via the UI, the transmitting comprises transmitting the user financial data to the server in association with the MICR.

Optionally, the at least one image quality parameter comprises an image brightness parameter and the instructions are indicative of a need to increase illumination in proximity of the financial document.

Optionally, the at least one image quality parameter comprises an image blueness parameter and the instructions are indicative of a need to change a distance between the portable device and the financial document.

Optionally, the portable device is handheld.

Optionally, the at least one image quality parameter comprises a composition parameter and the instructions are indicative of a need to tilt the angle of the financial document.

Optionally, the calculating comprises presenting the instructions on a display of the portable device.

Optionally, the calculating comprises audibly playing the instructions using a speaker of the portable device.

Optionally, the calculating comprises producing tactile singling according to the instructions using a tactile element of the portable device.

Optionally, the analyzing comprises segmenting a line of a plurality of separate elements and matching each separate element with a plurality of pattern to identify a MICR character.

According to some embodiments of the present invention there is provided a portable device that comprises an image sensor which captures a plurality of images depicting a financial document, a processor which processes at least one of the plurality of images to derive at least one image quality parameter indicative of a visibility level of the financial document in at least one of the plurality of images and calculates instructions indicative of at least one user operation required to change the at least one image quality parameter to increase the visibility level, a display for presenting the instructions while a user maneuvers the portable device, a magnetic ink character recognition (MICR) module which analyzes at least one of the plurality of images to extract a magnetic ink character recognition (MICR) code, and a communication interface which transmits the MICR code and the image to a server for depositing the financial document.

Optionally, the portable device is a cellular device.

According to some embodiments of the present invention there is provided a system that comprises a server which processes a plurality of financial document transaction requests each having a magnetic ink character recognition (MICR) code and an image of a financial document and a module installed in a portable device having an image sensor, a processor and a transmitter, the module uses the processor to extract a MICR code from a financial document imaged in an image captured using the image sensor and uses the transmitter to forward the MICR code and the image to the server via a network as a financial document transaction request.

Optionally, the module comprises a user instruction module which generates instructions which indicates to a user how to manipulate the portable device; the instructions are presented to the user using a member of a group consisting of a display, a speaker, and a vibrating element of the portable device.

Optionally, the module manages a user interface (UI) installed on the portable device and receives transaction related data from a user which uses the UI, the module uses the transmitter to forward the transaction related data to the server in association with the MICR code.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
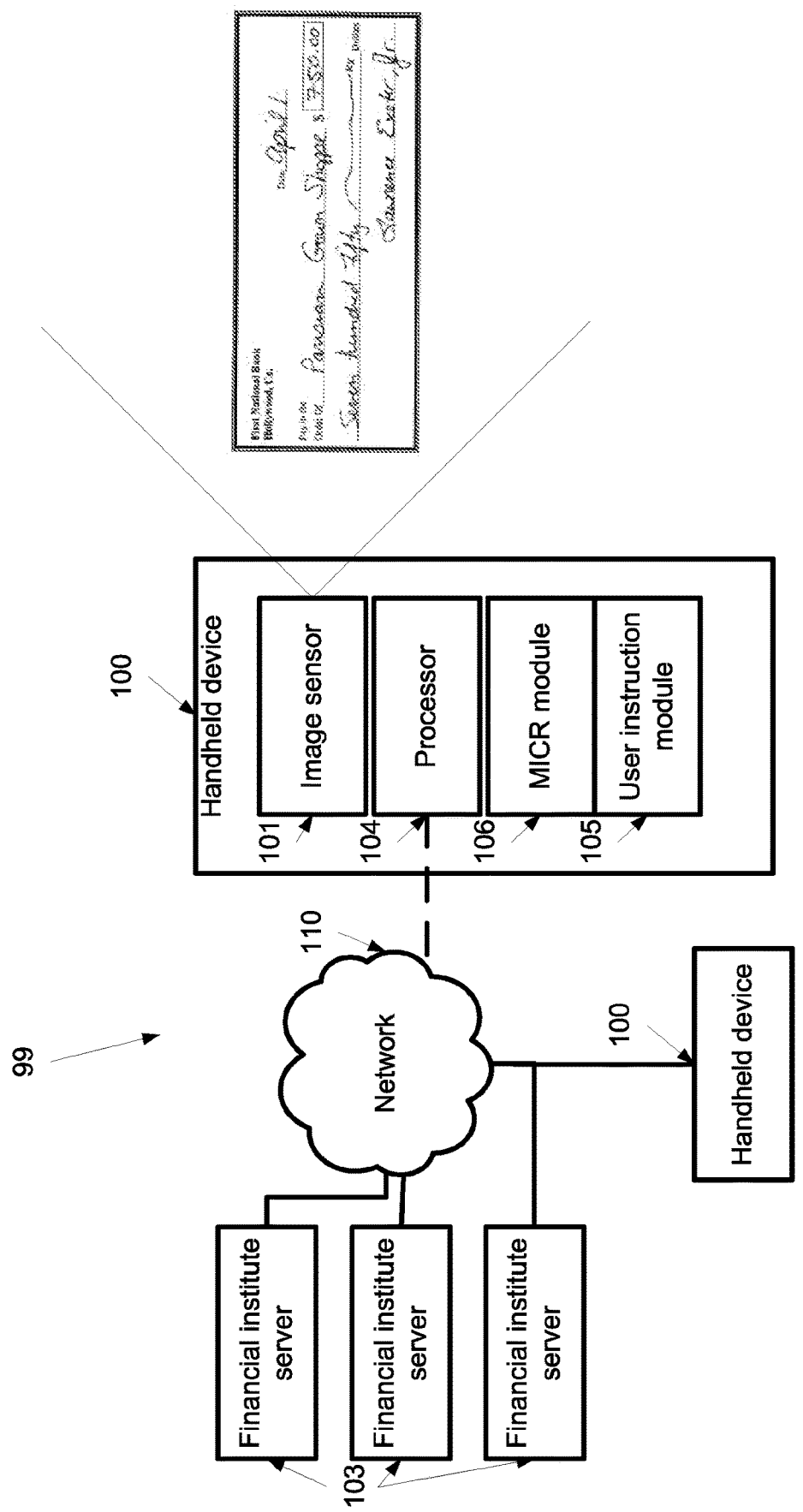
FIG. 1 is a schematic illustration of a system for facilitating a plurality of image sensor enabled portable devices to perform financial document transactions with one or more servers, according to some embodiments of the present invention.

The present invention, in some embodiments thereof, relates to financial document transactions, and, more particularly, but not exclusively, to methods and systems of using a portable device for financial document transactions.

According to some embodiments of the present invention, there are provided methods and systems for performing financial document transactions by walking a user through an image capturing process wherein she maneuvers an image sensor enabled portable device until an image which depicts a financial document at a sufficient visibility level is captured. The captured image is then analyzed to extract the MICR code that is later transmitted to a network node, such as a server of a financial institute, optionally together with the image from which the MICR code is extracted and/or similar images of the financial document. This allows the network node to perform a financial transaction based on the financial document.

Optionally, the visibility level is analyzed based on one or more image quality parameters of images of a video feed captured by the image sensor. The image quality parameters may be generated according to sharpness, brightness, and/or composition analysis.

Optionally, user generated content pertaining to financial document is provided by a user, for example using a user interface rendered on the display of the portable device. The user generated content, for example an account number for deposit, transaction data that includes an amount specified on the financial document, and a given date specified on the financial document. The user generated content is optionally sent, in association with the MICR code, to the server.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system 99 for facilitating a plurality of image sensor enabled portable devices 100 to perform financial document transactions with one or more network nodes 103, according to some embodiments of the present invention. Each portable device 100 having an image sensor 101 which extracts locally financial data from an imaged financial document, such as a check and forwards the financial data, optionally together with an image of the imaged financial document, to one or more of the remote network nodes 103, for example to a server, via a network 110, according to some embodiments of the present invention. The portable device 100 may be any camera enabled handheld device, such as a cellular phone, a tablet, a smart wearable device, such as camera enabled glasses and/or the like. The remote server 103 may be one of a plurality of servers, for example a financial institute server of one of a number of financial institutes, for example a bank server. The network 110 may be the Internet, a cellular communication network, an Ethernet and/or the like.

The portable device 100 optionally includes a processor 104, such as a multiple core advanced reduced instruction set computer (RISC) machine (ARM), a user instruction module 105 and a magnetic ink character recognition (MICR) module 106. Optionally, the user instruction module 105 and the MICR module 106 are parts of an application that is installed on the portable device 100, for example an app downloaded from an application store and/or installed on the portable device 100 in advance. Optionally, the user instruction module 105 and the MICR module 106 are temporally installed on the device as dynamic component that is uploaded to a browser executed on the portable device 100, for example an asynchronous JavaScript and extensible markup language (XML) (AJAX) object downloaded during the loading of a web service and/or a webpage.

Figure 2:
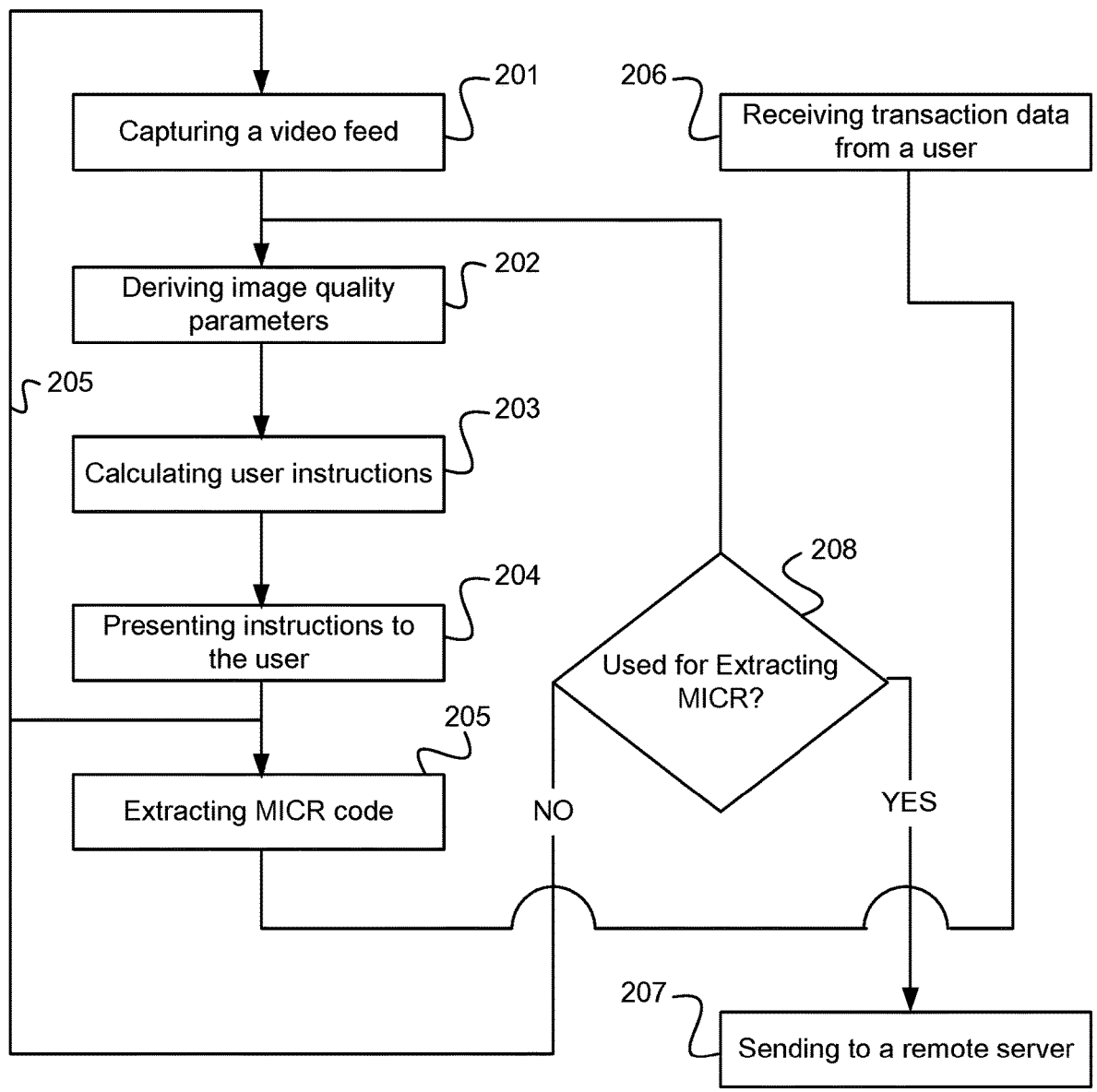
FIG. 2 is a flowchart of a user guided method of a remote deposit of a financial document, such as a check, according to some embodiments of the present invention.

Reference is now also made to FIG. 2, which is a flowchart 200 of a user guided method of a transaction, such as a remote deposit of a financial document, such as a check, according to some embodiments of the present invention.

First, as shown at 201, the portable device 100 uses the image sensor 101 to capture a video feed which comprises a plurality of frames, also referred to as images. Optionally each image is captured at a predefined interval. For example, in use, when the user wants to process a certain financial document, such as a check, using the portable device 100, for example to deposit the certain financial document in a bank account, he loads a graphical user interface (GUI), which is optionally managed by the user instruction module 105. The GUI is optionally presented on the display of the portable device 100 and renders the video feed captured by the image sensor 101. This allows the user to maneuver the portable device 100 to capture images of the certain financial document.

During the capturing of the video feed, as shown at 202, the frames of the video feed are processed, optionally continuously, to derive one or more image quality parameters indicative of a visibility level of the imaged financial document. The one or more image quality parameters include brightness parameters, orientation parameters, and/or sharpness parameters. These parameters may be calculated by image processing methods for evaluating brightness, composition, and blurriness, for example as known in the art. The visibility level may be an outcome of an image quality parameter and/or a combination of the one or more image quality parameters. In such embodiments, sufficient visibility level may be evaluated based on a match with a predefined threshold. The visibility level includes an array of values each set according to another of the image quality parameters. In such embodiments, sufficient visibility level may be evaluated based on a match with a set of thresholds each for another of the values.

Now, as shown at 203, instructions indicative of at least one user operation required to change the one or more image quality parameters so as to increase the visibility level of the imaged financial document in the captured image are calculated. Optionally, the calculation is locally performed on the portable device, by the user instruction module 105 and using the processor 104.

Optionally, as shown at 204, the calculated instructions are presented to the user, for example as visual instructions on the display of the portable device 101, as audible instructions, which are played using speakers of the portable device 101 and/or as tactile indications which are provided using vibrating elements of the portable device 101. Optionally, as shown at 205, the instructions are recalculated iteratively until one or more image with a sufficient visibility level is calculated.

According to some embodiments of the present invention, predefined instructions are associated with value(s) of image quality parameter(s). In such embodiments, the image quality parameter(s) which are extracted from the analysis of the video feed are matched with the value (s) of image quality parameter(s) and when a match is found. Respective instructions are presented to the user.

Figure 3:
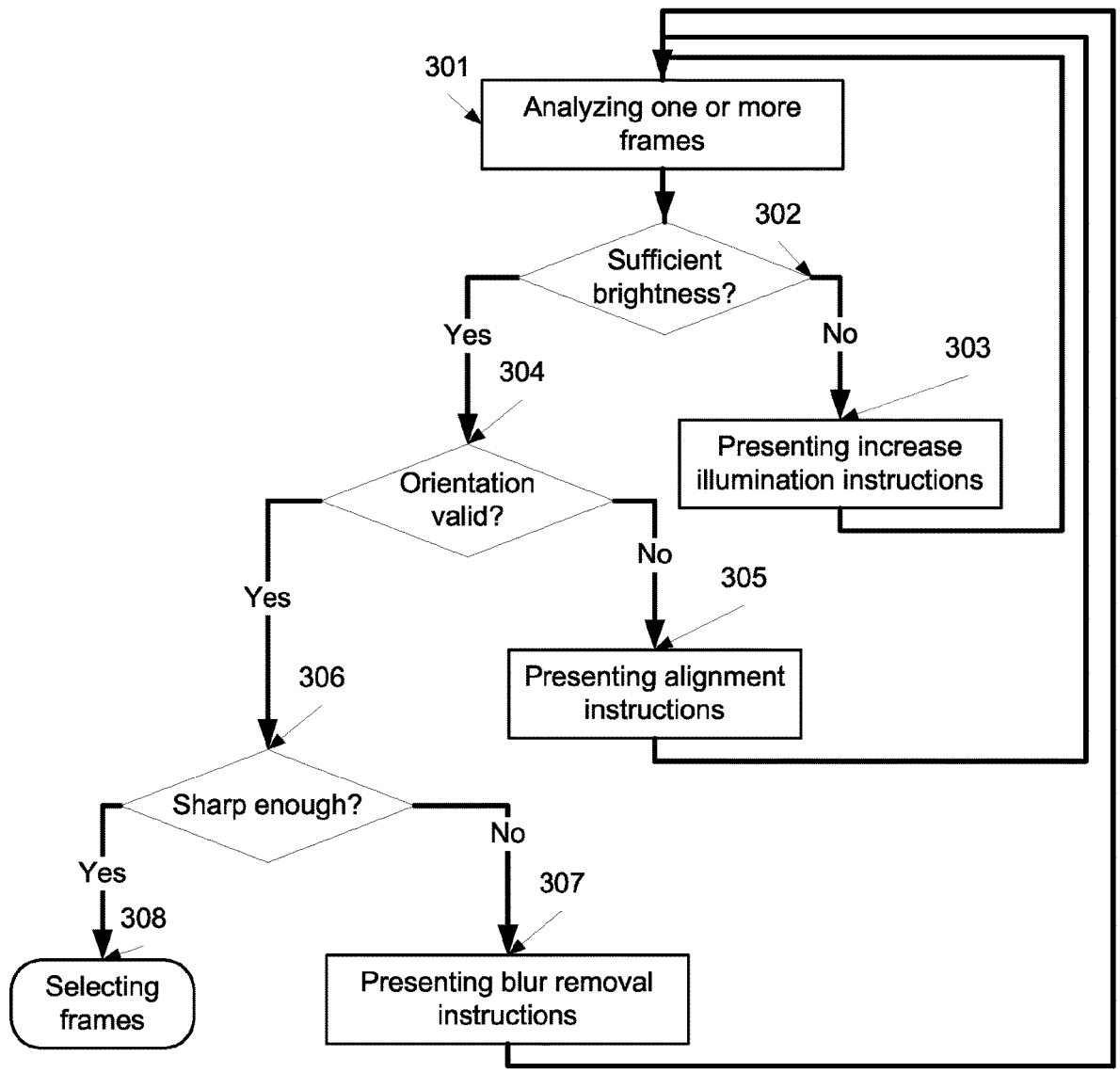
FIG. 3 is a flowchart of an exemplary process of instructing a user during the capturing of an image having a visibility level above a predefined threshold, according to some embodiments of the present invention.

For example, reference is now made to FIG. 3, which is a flowchart 300 of an exemplary process of instructing a user during the capturing of an image having a visibility level above a predefined threshold, according to some embodiments of the present invention. As shown at 301, the process is iteratively conducted on the images of the video feed. Optionally, as shown at 302, the image brightness is analyzed to determine a brightness level. If the brightness level is too low, the user is optionally asked to increase illumination, as shown at 303 and new frame(s) are captured and analyzed. Additionally or alternatively, as shown at 304, the image skew is analyzed in relation to edges of an element which having properties of a financial document. If the imaged financial document is not aligned in relation to the frame, the user is optionally asked to straighten the portable device 100, as shown at 305 and new frame(s) are captured and analyzed. Optionally, the captured frames are analyzed to identify the correct orientation of the portable device. Based on the correct orientation, the user is given with instructions which are indicative of the direction of a tilt he should make. Additionally or alternatively, as shown at 306, the image sharpness is analyzed. If the image is blurred, the user is optionally asked to adjust the location of the portable device 100 in relation to the finical document or to perform any other blur removal operation, as shown at 307 and new frame(s) are captured and analyzed. For example, the user is optionally asked to change the distance of the portable device from the financial document. Optionally, the captured frames are analyzed to identify whether the portable device is too close or too far from the financial document. Based on the correct orientation, the user is given with instructions indicative of the operation he should make. If the values of the verified quality parameters are sufficiently high, the one or more analyzed frames are selected, as shown at 308. Optionally each of the above tests is performed using a function which returns a Boolean value indicating whether the respective image quality parameter passed a predefined value or not and optionally a measured correction for calculating instructions in cases the test failed, for example an angle the device should be rotated or should the device pulled back from the focal point and/or pulled out. This calculation is used as translated to a presentation which designed to be perceived by the user, for example as described herein.

Reference is now made, once again, to FIG. 2. As shown at 205, when one or more of the frames has a visibility level above a visibility threshold, the one or more frames are analyzed to extract the MICR code from the financial document.

Figure 4:
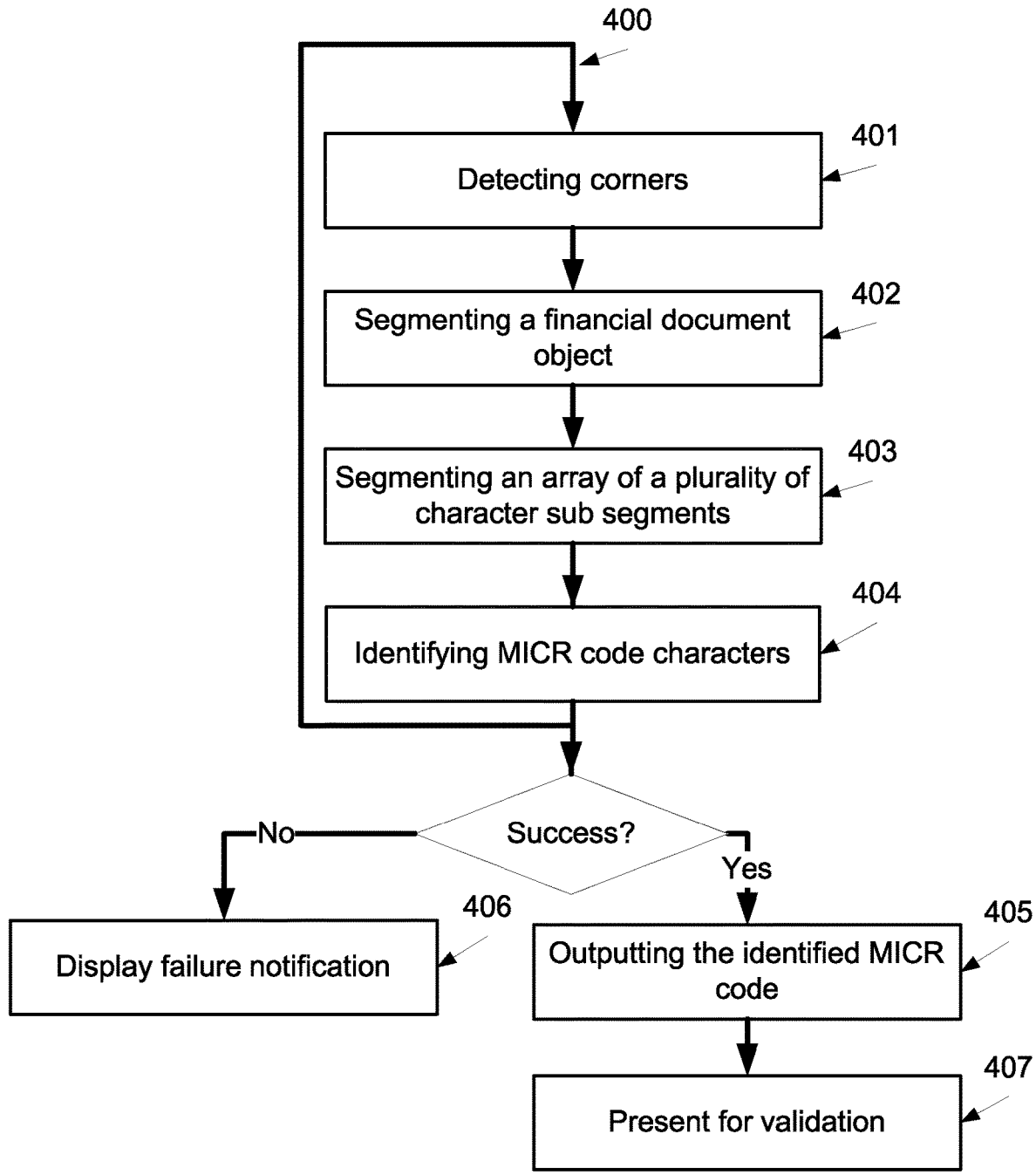
FIG. 4 is a flowchart of a process for extracting a MICR code from an image of a financial document, according to some embodiments of the present invention.

For example, reference is now made to FIG. 4, which is a flowchart 400 of a process for extracting MICR code from an image of a financial document that has a visibility level above a certain predefined threshold and referred to herein as a high visibility image, according to some embodiments of the present invention.

First, as shown at 401, corners of the financial document are detected, for example using a binary version of the high visibility image. Then, as shown at 402, the corners are optionally used for segmenting (cropping) an object which depicts the financial document in the high visibility image. Optionally, the cropped image is binarized to reduce computational complexity. Now, as shown at 403, a row of a plurality of character sub segments is identified in the object, for example according to binarization. Now, as shown at 404, MICR code characters are identified, for example by pattern matching each of the plurality of character segments. Optionally, each character sub segment is match with a number of patterns form a pattern dictionary of MICR digits. Each match results in a confidence level that allows selecting the best match. Optionally, if the confidence level of the best match pattern is above a certain threshold, then a MICR character is considered as identified. Optionally, the character segments are identified based on their proportions, percentage of black pixels in a segment, a pattern match and/or the like. Optionally, a control digit is used to verify the correctness of the identification. This allows, as shown at 405, to output the MICR code. Optionally, if the process fails and the MICR code is not identified, for example as shown at 406, the user is presented with a notification. This allows the user to repeat the above process on a new high visibility image and/or to determine that an image of the MICR code is sent without an analysis. Optionally, as shown at 407, the user is requested to manually validate the identified MICR code that is presented thereto.

Reference is now made, once again, to FIG. 2. Optionally, as shown at 206, the user provides transaction data pertaining to the financial document, for example a target account for deposit, a recipient name, a password, an identification (ID) number and/or the like. Optionally, the transaction data includes an amount specified on the financial document. Optionally, the transaction data includes a given date specified on the financial document. Optionally, the transaction data is inputted using a designated UI which is presented to the user, before, during, and/or after the capturing of the image and/or the extraction of the MICR.

As shown at 207, the MICR code is sent to the remote server 103 via the network 110, for example in transmission control protocol internet protocol (TCP/IP) messages, for instant hypertext transfer protocol (HTTP) messages, optionally encrypted. Optionally, the image from which the MICR code is extracted and/or a similar image and/or one or more sequential images are sent together or in association with the MICR code, as shown at 208. This may be used as a proof of proprietorship of the financial document. Optionally, the transaction data is sent to the remote server 103 or in association with the MICR code. The receiving server 106 now may process the financial document and optionally any transaction data that is associated therewith, for example make accordingly a deposit to the account of the user and/or in an account specified by the user.

Optionally, the portable device 200 pulls the server 103 to receive a status of the transaction. Based on the status the user is either informed that transaction is completed or asked to recapture the MICR code, image and/or user provided transaction data.

It is expected that during the life of a patent maturing from this application many relevant systems and methods will be developed and the scope of the term a processor, a module, and an image sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of presenting a graphical user interface (GUI) on a portable device for walking a user through an image capturing process for improving visibility level of images captured by an image sensor of the portable device to identify magnetic ink character recognition (MICR) code for performing a transaction of a financial document, comprising:

capturing, using an image sensor of the portable device, a plurality of images of a video feed depicting a financial document;

performing, using at least one hardware processor of the portable device, the following for each one of said plurality of images during said capturing:
processing and analyzing a respective said image to detect an alignment of edges of said financial document in relation to a frame of said respective image;
deriving a visibility level of said financial document in said respective image, based on said alignment;
extracting a threshold value from a predefined array of a plurality of thresholds corresponding to a plurality of image quality parameters, said extracted threshold corresponds to said alignment;
comparing said visibility level to said extracted threshold;
calculating, based on an outcome of said analysis, at least one user operation required to change a tilt orientation of said portable device for increasing said visibility level;
presenting within the GUI on a display of the portable device, visual instructions indicative of the at least one user operation for execution by a user of said portable device while said user maneuvers said portable device; and
when said respective image having said visibility level below said threshold, repeat said processing, said analyzing, said deriving, said comparing, said calculating, and said presenting within the GUI for a following image of said plurality of images,
wherein said GUI presents visual instructions that are recalculated iteratively while said image sensor captures said video feed, the GUI presents instructions for maneuvering the portable device by the user until at least one certain image which has a visibility level above said threshold is captured;
when said respective image having said visibility level above said threshold, analyzing said respective image to extract a magnetic ink character recognition (MICR) code by identifying each of a plurality of characters of said code; and
transmitting said MICR code and said respective image to a server for performing a financial transaction based on said financial document.

2. The method of claim 1, wherein said transmitting comprises transmitting said respective image in association with said MICR code to said server.

3. The method of claim 1, further comprising presenting a user interface (UI) on said display of said portable device and receiving from a user financial data via said UI, said transmitting comprises transmitting said user financial data to said server in association with said MICR.

4. The method of claim 1, wherein said visibility level of said financial document is calculated based on an image brightness parameter and said visual instructions comprises additional visual instructions for said user to increase illumination in proximity of said financial document.

5. The method of claim 1, wherein said visibility level of said financial document is calculated based on an image blueness parameter and said visual instructions comprises additional visual instructions for said user to change a distance between said portable device and said financial document.

6. The method of claim 1, wherein said portable device is handheld.

7. The method of claim 1, wherein visibility level of said financial document is calculated based on a composition parameter and said visual instructions comprises additional visual instructions for said user to tilt the angle of said financial document.

8. The method of claim 1, wherein said presenting comprises audibly playing audible instructions using a speaker of said portable device.

9. The method of claim 1, wherein said presenting comprises producing tactile singling according to said instructions using a tactile element of said portable device.

10. The method of claim 1, wherein said analyzing comprises segmenting a line of a plurality of separate elements and matching each said separate element with a plurality of pattern to identify a MICR character.

11. Computer-readable code stored on a non-transitory computer readable medium comprising computer executable instructions adapted to perform a method of presenting a graphical user interface (GUI) on a portable device for walking a user through an image capturing process for improving visibility level of images captured by an image sensor of the portable device to identify magnetic ink character recognition (MICR) code for performing a transaction of a financial document, the method comprising:
capturing, using an image sensor of the portable device, a plurality of images of a video feed depicting a financial document performing the following for each one of said plurality of images during said capturing:
processing and analyzing a respective said image to detect an alignment of edges of said financial document in relation to a frame of said respective image;
deriving a visibility level of said financial document in said respective image, based on said alignment;
extracting a threshold value from a predefined array of a plurality of thresholds corresponding to a plurality of image quality parameters, said extracted threshold corresponds to said alignment;
comparing said visibility level to said extracted threshold;
calculating, based on an outcome of said analysis, at least one user operation required to change a tilt orientation of said portable device for increasing said visibility level;
presenting within the GUI on a display of the portable device, visual instructions indicative of the at least one user operation for execution by a user of said portable device while said user maneuvers said portable device; and
when said respective image having said visibility level below said threshold, repeat said processing, said analyzing, said deriving, said comparing, said calculating, and said presenting within the GUI for a following image of said plurality of images;
wherein said GUI presents visual instructions that are recalculated iteratively while said image sensor captures said video feed, the GUI presents instructions for maneuvering the portable device by the user until at least one certain image which has a visibility level above said threshold is captured;
when said respective image having said visibility level above said threshold, analyzing said respective image to extract a magnetic ink character recognition (MICR) code by identifying each of a plurality of characters of said code;
and
transmitting said MICR code and said respective image to a server for performing a financial transaction based on said financial document.

12. A portable device including a GUI for walking a user through an image capturing process, comprising:
   an image sensor which captures a plurality of images of a video feed depicting a financial document;
   a display;
   at least one hardware processor adapted to perform the following for each one of said plurality of images:
   processing and analyzing a respective said image to detect an alignment of edges of said financial document in relation to a frame of said respective image;
   deriving a visibility level of said financial document in said respective image, based on said alignment;
   extracting a threshold value from a predefined array of a plurality of thresholds corresponding to a plurality of image quality parameters, said extracted threshold corresponds to said alignment;
   comparing said visibility level to said extracted threshold;
   calculating, based on an outcome of said analysis, at least one user operation required to change a tilt orientation of said portable device for increasing said visibility level;
   presenting within the GUI on said display of the portable device, visual instructions indicative of the at least one user operation for execution by a user of said portable device while said user maneuvers said portable device; and
   when said respective image having said visibility level below said threshold repeat said processing, said calculating, and said presenting within the GUI for a following image of said plurality of images,
   wherein said GUI presents visual instructions that are recalculated iteratively while said image sensor captures said video feed, the GUI presents instructions for maneuvering the portable device by the user until at least one certain image which has a visibility level above said threshold is captured;
   when said respective image having said visibility level above said threshold, analyzing said respective image to extract a magnetic ink character recognition (MICR) code by identifying each of a plurality of characters of said code; and
   a communication interface which transmits said MICR code and said respective image to a server for depositing said financial document.

13. The portable device of claim 12, wherein said portable device is a cellular device.

14. The portable device of claim 12, wherein said at least one hardware processor executes a code for displaying a user interface (UI) on said display; wherein said UI is adapted for receiving transaction related data from a user which uses said UI, said communication interface is adapted to forward said transaction related data to said server in association with said MICR code.

15. The method of claim 1, wherein the visual instructions are predefined instructions associated with values of image quality parameters, wherein the at least one user operation is calculated by matching predefined instructions to values of image quality parameters extracted for the video feed.

* * * * *